US008436587B2

(12) United States Patent
Aanensen et al.

(10) Patent No.: US 8,436,587 B2
(45) Date of Patent: May 7, 2013

(54) BIPOLAR OVERVOLTAGE BATTERY PULSER AND METHOD

(76) Inventors: Ove T. Aanensen, Kristiansand (NO); Dag Arild Valand, Wachtberg (DE)

( * ) Notice: Subject to any disclaimer, the term of this patent is extended or adjusted under 35 U.S.C. 154(b) by 248 days.

(21) Appl. No.: 12/774,190

(22) Filed: May 5, 2010

(65) Prior Publication Data

US 2011/0273143 A1    Nov. 10, 2011

(51) Int. Cl.
    H02J 7/04      (2006.01)
    H02J 7/16      (2006.01)
(52) U.S. Cl.
    USPC .......................................................... 320/139
(58) Field of Classification Search .................... 320/139
    See application file for complete search history.

(56) References Cited

U.S. PATENT DOCUMENTS

| | | | | |
|---|---|---|---|---|
| 4,484,136 A | * | 11/1984 | Tuttle | 324/537 |
| 4,607,208 A | | 8/1986 | Vreeland | |
| 5,159,258 A | | 10/1992 | Kolvites et al. | |
| 5,493,196 A | | 2/1996 | Feldstein | |
| 5,600,226 A | | 2/1997 | Falcon | |
| 5,633,574 A | | 5/1997 | Sage | |
| 5,777,453 A | | 7/1998 | Imanaga | |
| 5,998,968 A | | 12/1999 | Pittman et al. | |
| 6,130,522 A | | 10/2000 | Makar | |
| 6,229,285 B1 | | 5/2001 | Ding | |
| 6,835,491 B2 | | 12/2004 | Garstein et al. | |
| 2003/0042871 A1 | | 3/2003 | Schlicht | |
| 2003/0199050 A1 | * | 10/2003 | Mangano et al. | 435/173.6 |
| 2004/0032237 A1 | * | 2/2004 | Dykeman | 320/141 |
| 2006/0087291 A1 | | 4/2006 | Yamauchi | |

FOREIGN PATENT DOCUMENTS

| | | |
|---|---|---|
| CN | 101 404 346 A | 4/2009 |
| JP | 62 119473 A | 5/1987 |

OTHER PUBLICATIONS

Arduini, D. P., *Extending Battery Life and Reliability*, Proceedings of High Frequency Power Conversion HFPC '98 Conference, Nov. 1998, pp. 245-256.
Gerthsen, C. et al., *Gerthsen Physics*, 19 ed., Springer Verlag, Berlin and New York (1997), pp. 339-340.
Brady, J. E., *General Chemistry—Principles and Structure*, John Wiley & Sons, New York (2000), p. 468 and p. 480.
Milchev, A., *Electrocrystallization—Fundamentals of Nucleation and Growth*, Kluwer Academic Publishers, New York (2002), Chapter 1, pp. 1-10.
Wang J B et al: "Design considerations of microprocessor-controlled multiphase battery charger with fast-charging strategy"; vol. 1, No. 2, Mar. 1, 2007, pp. 143-152; XP006028311.
Dingzhen Li et al: "Design and Implication of the Great-Capacity Auto-Charging Equipment"; Information Engineering and Computer Science 2009, International Conference on IEEE, Piscataway, NJ, USA; Dec. 19, 2009; pp. 1-6; XP031589931.
International Search Report and Written Opinion from International Application No. PCT/EP2011/002250, mailed Mar. 30, 2012.
Buschel, et al., *Calculation of the distribution of relaxation times for characterization of the dynamic battery behavior, 2012-9th* International Multi-Conference on Systems, Signals and Devices, 978-1-4673-1591-3/12 © 2012 IEEE.
Ganesh, et al., *New symmetric and asymmetric supercapacitors based on high surface area porous nickel and activated carbon*, Journal of Power Sources, 2006, vol. 158, pp. 1523-1532.
Riley, *Hectorite-based nanocomposite electrolytes for lithium-ion batteries*, A thesis submitted to the Graduate Faculty of North Carolina State University, Department of Chemical Engineering, Raleigh, NC, Mar. 2002.

\* cited by examiner

*Primary Examiner* — Arun Williams
(74) *Attorney, Agent, or Firm* — Alston & Bird LLP

(57) ABSTRACT

A bipolar overvoltage battery pulser and method are provided that apply a positive pulse voltage and a negative pulse voltage alternately across the terminals of a battery. The object of the bipolar overvoltage battery pulser and method is to increase the cycle lifetime and capacity of storage batteries, such as lead acid batteries. The rise times for the leading edges of the positive pulses and for the trailing edges of the negative pulses are short compared to the ionic relaxation time in the electrochemical solution. Alternating between the positive and negative pulses gives each new pulse an equal starting condition without realizing any memory effect that otherwise may result if the last applied pulse was of the same polarity, which reduces the extent of overvoltage that may be applied to the battery and decrease the highest useable pulse cycling frequencies that could be achieved without experiencing pulse overlapping. The shape, type and timing of the pulses may be adjusted to create overvoltage pulses having high duration and amplitude.

24 Claims, 9 Drawing Sheets

BIPOLAR OVERVOLTAGE BATTERY PULSER AND METHOD

FIELD OF INVENTION

The present invention relates to a bipolar overvoltage battery pulser and method for increasing the cycle lifetime and capacity of a battery.

BACKGROUND

A rechargeable battery is an electrochemical cell that stores energy, delivering that energy upon discharge of current based upon the demand of the electrical device. A rechargeable battery may be recharged by forcing an electrical current through the battery in a direction opposite to that of discharge.

A commonly encountered problem with rechargeable batteries is a loss in the energy capacity of the battery over subsequent recharging cycles resulting in a reduced amount of time of battery usage until the next recharging cycle. For example, a loss in the ability to retain full energy capacity of a battery may result after a charging cycle follows a period of use when the battery does not become fully discharged. The loss in the ability to retain full energy capacity may become exasperated when there are repeated cycles of shallow discharging followed by a charging cycle. To reduce the extent of loss to retain substantially full energy capacity of a battery further preventing a rapid deterioration in available energy capacity after a charge cycle, manufacturers recommend subjecting a rechargeable battery to a deep discharge prior to recharging the battery.

While there are many phenomena that can contribute to this loss in ability of the battery to retain full charge capacity, it is known that a deterioration in the ability of an active constituent to become regenerated at any one or both of the anode and cathode may be a contributing factor. For example, it has been reported that the decline in capacity of lead acid batteries is associated with a progressive change in the nature of the active materials of the cathode and the anode, which also contributes to a reduction in life of the battery as well as a loss in the ability of the battery to retain capacity. The initial state of the surface structure of the cathode and anode is porous allowing a greater amount of the active material to become exposed to the surrounding electrolyte of the battery. As the battery undergoes multiple discharge and recharge cycles, the surface structure of the cathode and anode progressively becomes increasingly defined by aggregate crystalline structures that reduce the overall surface contact of the active material with the electrolyte solution of the battery.

Attempts in the prior art to reduce these effects in a battery have been directed to improved battery charge cycles that include insuring the battery becomes deeply discharged prior to recharging the battery to a recommended operating level. Other battery chargers in the prior art control the pattern of charge and, in some cases, may include a slight discharge sequence over the period of charging the battery. For example, U.S. Pat. No. 5,633,574 to Sage discloses a charging sequence for a battery that includes repeatably applying a sequence that includes 1000 milliseconds of charging, 2 milliseconds of no charging, 5 milliseconds of discharging, and 10 milliseconds of no charging may reduce the extent of loss in ability for the battery to retain full charge capacity. U.S. Pat. No. 5,998,968 to Pittman et al. discloses applying a discharge, charge, and rest period to a battery in a predetermined charging sequence until the battery becomes fully charged. U.S. Pat. No. 5,777,453 to Imanaga represents even another charge sequencing strategy whereby voltage pulses are periodically applied to a battery followed by a rest period when no voltage is applied during the charging sequence.

Repeated losses in the ability of the battery to retain full charge capacity over multiple charging cycles may also contribute to an overall reduction in the life of the battery. I.e., it is known that a loss in the ability of the battery to retain capacity is not fully irreversible and may be cumulative over the life of the battery resulting in an overall reduction in the life of the battery.

During a charge cycle, the electrodes or plates attract ions—negative ions to the positive plate and positive ions to the negate plate—which impedes the further transfer of ions to the plates. As the battery becomes charged, an increased impedance develops resulting in an increased resistance of the battery to become charged. Eventually, upon completion of charging and removal of any overvoltage, an equilibrium will develop at the anode and cathode such that the rate of transfer of ions to the electrodes equals the rate of transfer of the same types of ions away from the electrodes.

The equations of Boltzmann, represented by equation 1, and Nernst, represented by equation 2, describe the thermodynamic equilibrium (the stable state) that develops in an electrochemical system in terms of the ratio of the density of ions in the bulk electrochemical solution, $D_{se}$, relative to the density of the same types of ions present in the surface layer of the electrode, $D_{me}$, in relation to the potential difference, $(V_{se}-V_{me})$, that exists between the electrochemical solution and the electrode and its mutual dependence on said ratio $D_{se}/D_{me}$. See, e.g., Christian Gerthsen and Helmut Vogel: Gerthsen Physics, 19 ed., Springer Verlag, Berlin and New York.

$$(D_{se}/D_{me})=e^{-(V_{se}-V_{me})*q/kT} \quad (1)$$

$$(V_{se}-V_{me})=-(kT/q)*\ln(D_{se}/D_{me}) \quad (2)$$

where:
q=charge of an electron, Coulomb
k=Boltzmann constant, Joule/Kelvin
T=absolute temperature, Kelvin
$D_{se}/D_{me}$=ratio of the ionic density of the electrochemical solution to the ionic density of the surface layer at the electrode at equilibrium
$(V_{se}-V_{me})$=potential difference between electrochemical solution and electrode at equilibrium, volts At equilibrium conditions, the system is stable, i.e., the formation, growth or dissolution or phase transitions do not occur. At equilibrium, the flux of any ionic species into the surface layer at the electrode will be compensated for by the flux of an equal number of the same ionic species from the surface layer at the electrode into the electrochemical solution.

In all chemical systems there is a tendency to change to the equilibrium state. See, e.g., James E. Brady: General Chemistry—Principles and Structure, John Wiley & Sons, New York. If an existing equilibrium is disturbed, for example, by imposing a change in the potential at the electrode, then the ratio of the ionic density of the electrochemical solution to ionic density of the surface layer at the electrode will change until a new equilibrium condition is achieved. The relaxation time is defined as the amount of time needed for the system to arrive at a new equilibrium condition. The relaxation time constant, which characterizes the change in ratio of ionic densities versus time, is defined by the specific dielectric constant divided by the specific electrical conductivity, both of which are properties of the electrolytic solution.

Favorable conditions for phase transitions, i.e., for ions from the electrolyte solution discharging on the surface of the electrode, occur when the solution is supersaturated and the system departs from its equilibrium condition. For example, supersaturation occurs when the potential $V_s$ of the ions in the electrochemical solution is greater than the equilibrium potential $V_{me}$ on the electrode, as represented by equation (3).

$$(V_s - V_{me}) > 0 \quad (3)$$

There are two possibilities for addressing this supersaturation condition. One possibility is to impose a potential on the electrode $V_m$ that is more negative or less than the potential of the electrode at equilibrium $V_{me}$ while the potential of the electrochemical solution is maintained at its equilibrium potential as represented by equation (4).

$$(V_{se} - V_m) > 0 \quad (4)$$

The difference between the potential of the electrode at equilibrium and the potential of the electrode under the circumstances as described above is known as electrochemical overpotential or the electrochemical overvoltage as represented by equation (5).

$$(V_{me} - V_m) > 0 \quad (5)$$

Another possibility for addressing the supersaturation condition is by imposing on the electrochemical solution a potential $V_{ds}$ that is higher than the potential of the electrochemical solution at equilibrium $V_{se}$ by keeping the potential on the electrode $V_m$ at its equilibrium potential $V_{me}$. Thus, the circumstances of the overvoltage condition as represented in equation (3).

The two quantities, the condition of supersaturation and the overvoltage, can be considered as measures for the deviation from the state of stable thermodynamic equilibrium. However, the mere fact that the system is supersaturated and the overvoltage exists does not necessarily create a phase transition. Rather, these conditions increase the probability that a phase transition may occur. See, e.g., Alexander Milchev: Electrocrystallization—Fundamentals of Nucleation and Growth, Kluwer Academic Publishers, New York.

There remains a need in the art for an apparatus and method that operates to reduce the loss of the capability of the battery to store energy over time and increase the overall life of the battery during the entire operational cycle of the battery, i.e., even outside the period when the battery is being charged.

BRIEF SUMMARY

The present invention relates to devices and methods for increasing the cycle lifetime and capacity of a battery. Without intending to be bound by theory, a bipolar overvoltage battery pulser and the techniques of the invention maintain the capacity of a battery and extends the operating life of the battery.

In one aspect, the invention provides a bipolar overvoltage battery pulser that includes a pulse generator that produces a positive pulsed voltage and a negative pulsed voltage, a positive pulsed voltage driver that converts the positive pulsed voltage into a positive pulsed voltage waveform, a negative pulsed voltage driver that converts the negative pulsed voltage into a negative pulsed voltage waveform, and a pulsed voltage distributor that merges the positive pulsed voltage waveform and the negative pulsed voltage waveform into a pulsed voltage waveform that is applied across the terminals of a battery.

In an embodiment of the invention, the pulse generator of the bipolar overvoltage battery pulser is configured in a microcontroller. In another embodiment of the invention, the pulse generator of the bipolar overvoltage battery pulser has a positive pulse generator that generates the positive pulsed voltage and a negative pulse generator that generates the negative pulsed voltage. In yet another embodiment of the invention, the pulse generator has an alternating inverter switch wherein the pulse generator generates a pulsed voltage, the alternating inverting switch alternately processes the pulsed voltage into a pass-through pulsed voltage and an inverted pulsed voltage, and the pass-through pulsed voltage is any one of the positive pulsed voltage and the negative pulsed voltage while the inverted pulsed voltage is the other one of the positive pulsed voltage and the negative pulsed voltage.

In an embodiment of the invention, the positive pulsed voltage driver and the negative pulsed voltage driver of the bipolar overvoltage battery pulser each has a pulse shaper and a timing generator wherein the pulse shaper and the timing generator are configured to convert a pulsed voltage to a pulsed voltage waveform.

Pursuant to certain embodiments of the invention, a positive voltage amplifier and a negative voltage amplifier amplifies the positive pulsed voltage waveform and the negative pulsed voltage waveform, respectively. In certain other embodiments of the invention, a voltage amplifier amplifies the pulsed voltage waveform.

In an embodiment of the invention, the pulsed voltage waveform of the bipolar overvoltage battery pulser has at least one positive voltage pulse defined by a leading edge and a positive pulse amplitude followed by at least one negative voltage pulse defined by a trailing edge and a negative or inverted pulse amplitude. Pursuant to this embodiment of the invention, the rise time of the leading edge of the at least one positive voltage pulse and the rise time of the trailing edge of the at least one negative voltage pulse are each less than a relaxation time of an electrolytic solution of the battery. Specifically, the rise time of the leading edge and the rise time of the trailing edge may be about one-third of the relaxation time.

In certain embodiments of the invention, the positive pulse amplitude of the at least one positive voltage pulse and the negative pulse amplitude of the at least one negative voltage pulse are greater than a voltage of the battery, for instance, at least about twice the voltage of the battery.

In an embodiment of the invention, a pulse cycle frequency of the pulsed voltage waveform is such that a pulse width of the at least one positive voltage pulse and a pulse width of the at least one negative voltage pulse do not overlap. In another embodiment of the invention, both the pulse width of the at least one positive voltage pulse and the pulse width of the at least one negative voltage pulse exceed the relaxation time.

In another embodiment of the invention, the bipolar overvoltage battery pulser additionally comprises a controller and a measurement device that measures the voltage of the battery. Pursuant to this embodiment of the invention, the controller identifies a state of the battery using the voltage of the battery and activates the bipolar overvoltage battery pulser based upon the state of the battery.

In an embodiment of the invention, the bipolar overvoltage battery is for treating a lead acid battery. In another embodiment of the invention, the bipolar overvoltage battery pulser may treat other types of batteries (i.e., non-lead acid batteries).

In certain embodiments of the invention, the bipolar overvoltage battery pulser of the invention is directly integrated within the battery.

Another aspect of the invention provides methods for treating a battery. In an embodiment of the invention, the method for treating a battery includes the step of using a bipolar overvoltage battery pulser of the invention to increase a cycle lifetime of the battery and an ability of the battery to retain capacity.

In yet another embodiment of the invention, a method for treating a plurality of batteries with each battery of the plurality of batteries having a bipolar overvoltage battery pulser of the invention, includes the step of controlling each of the bipolar overvoltage battery pulsers such that not more than one of the bipolar overvoltage battery pulses is applying an overvoltage at any one time.

In an embodiment of the invention, a method for treating a battery comprises the steps of providing a positive pulsed voltage waveform having a single positive pulse and a negative pulsed voltage waveform having a single negative or inverted pulse, and applying the positive pulsed voltage waveform and the negative pulsed voltage waveform alternately across the terminals of a battery. Pursuant to this embodiment of the invention, the method for treating the battery may further comprise the step of merging the positive pulsed voltage waveform and the negative pulsed voltage waveform before applying the waveforms across the terminals of the battery.

In another embodiment of the invention, the single positive pulse is defined by a leading edge and a positive pulse amplitude and the negative or inverted pulse is defined by a trailing edge and a negative pulse amplitude. In certain embodiments of the invention, a rise time of the leading edge and a rise time of the trailing edge are each less than a relaxation time of an electrolytic solution of the battery.

In an embodiment of the invention, a method comprises the steps of producing a positive pulsed voltage and a negative pulsed voltage, converting the positive pulsed voltage to a positive pulsed voltage waveform and the negative pulsed voltage to a negative pulsed voltage waveform, merging the positive pulsed voltage waveform and the negative pulsed voltage waveform into a pulsed voltage waveform, and applying the pulsed voltage waveform across terminals of a battery.

In another embodiment of the invention, the method may additionally include the step of amplifying the positive pulsed voltage waveform and the negative pulsed voltage waveform, or, in another embodiment of the invention, amplifying the pulsed voltage waveform that includes the merged positive pulsed voltage waveform and the negative pulsed voltage waveform.

In certain embodiments of the invention, the producing step of the method comprises the steps of generating a pulsed voltage and processing the pulsed voltage, alternately, into a pass-through pulsed voltage and an inverted pulsed voltage, wherein the pass-through pulsed voltage is any one of the positive pulsed voltage and the negative pulsed voltage, and the inverted pulsed voltage is the other one of the positive pulsed voltage and the negative pulsed voltage.

In certain embodiments of the invention, the converting step of the method comprises the steps of shaping the positive pulsed voltage and the negative pulsed voltage respectively into a positive pulsed voltage shape and a negative pulsed voltage shape and timing a distribution of the positive pulsed voltage shape and a distribution of the negative pulsed voltage shape respectively into the positive pulsed voltage waveform and the negative pulsed voltage waveform.

Other aspects and embodiments will become apparent upon review of the following description taken in conjunction the accompanying drawings. The invention, though, is pointed out with particularity by the appended claims.

BRIEF DESCRIPTION OF THE SEVERAL VIEWS OF THE DRAWINGS

Figure 1:
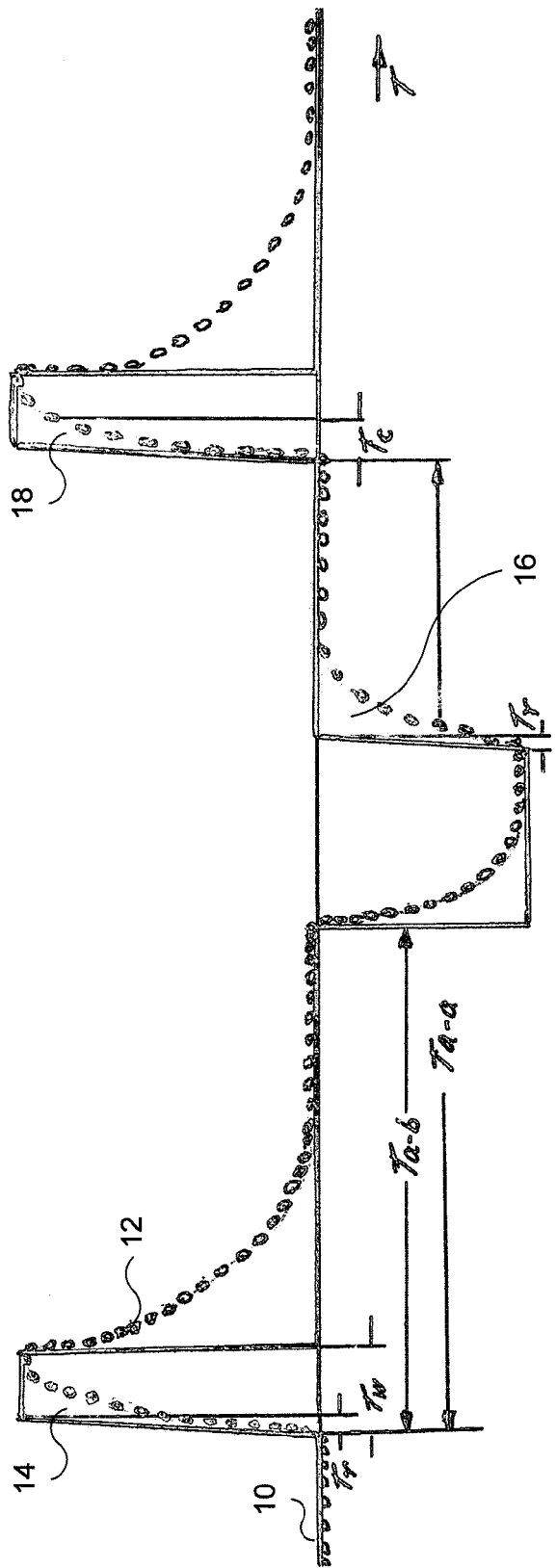
Figure 2:
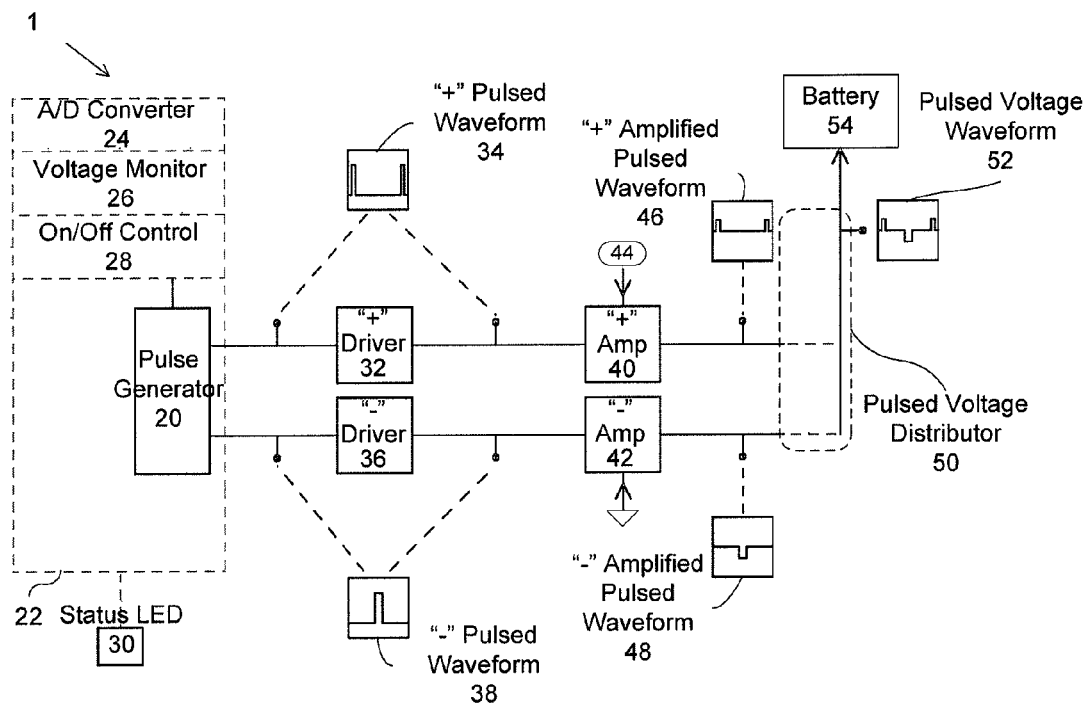
Figure 3A:
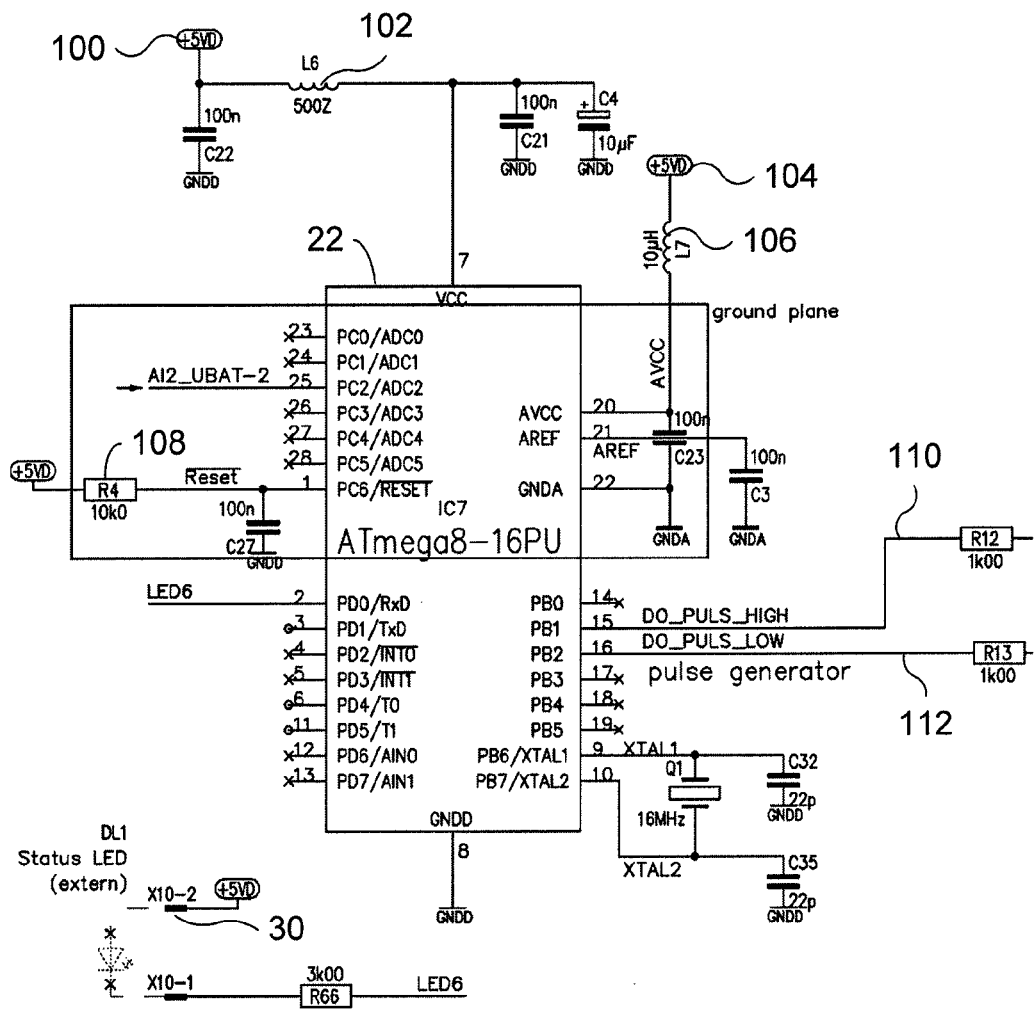
Figure 3B:
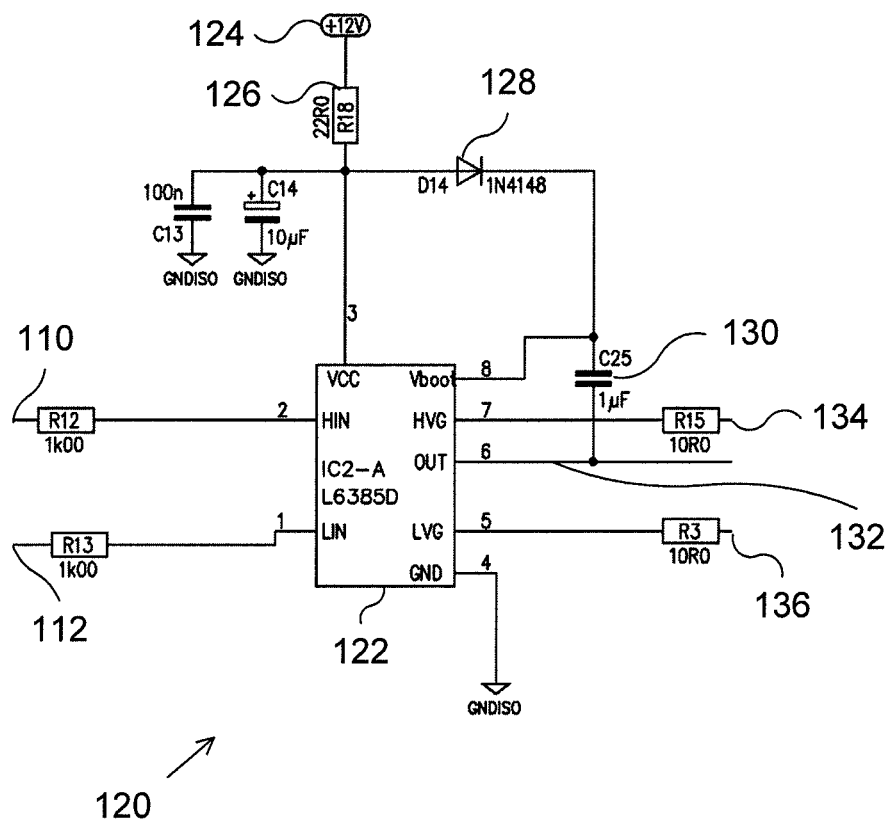
Figure 3C:
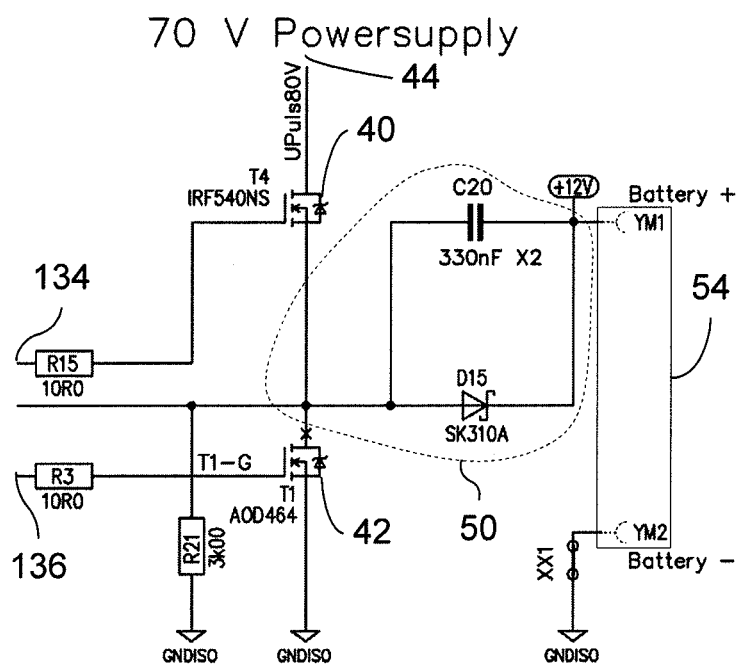
Figure 3D:
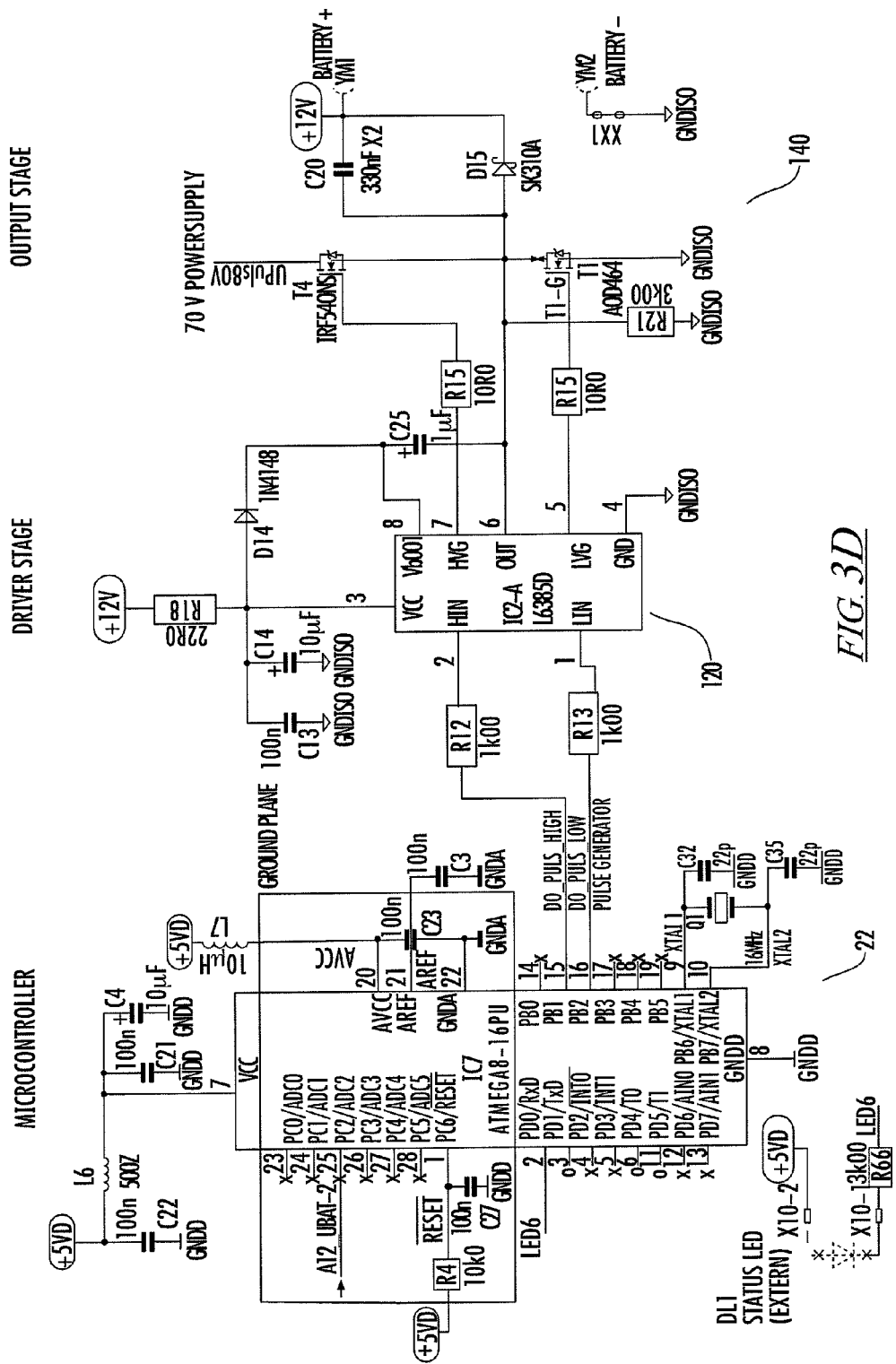
Figure 4:
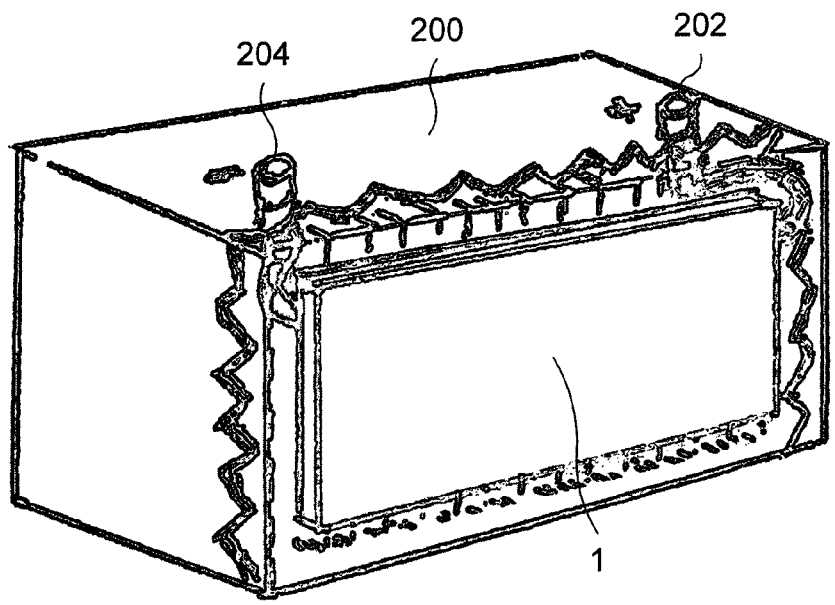
Figure 5:
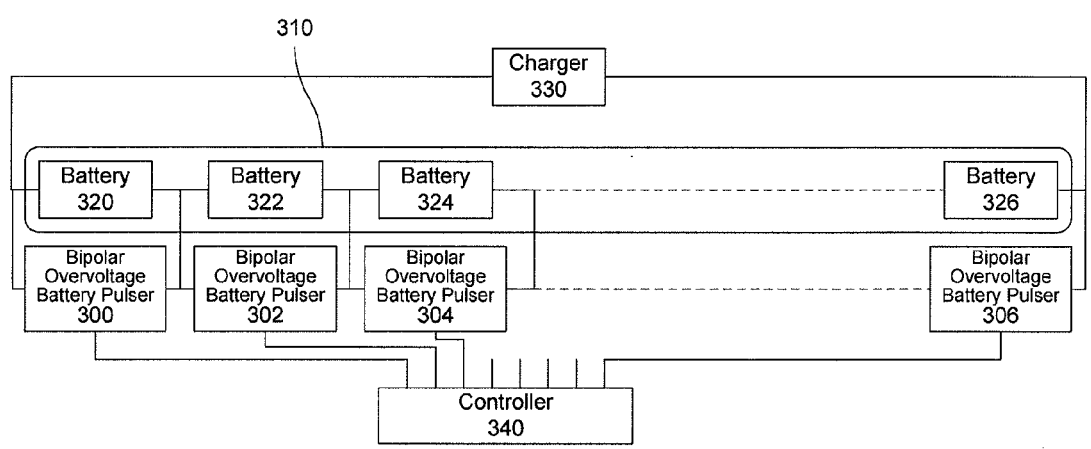
Figure 6:
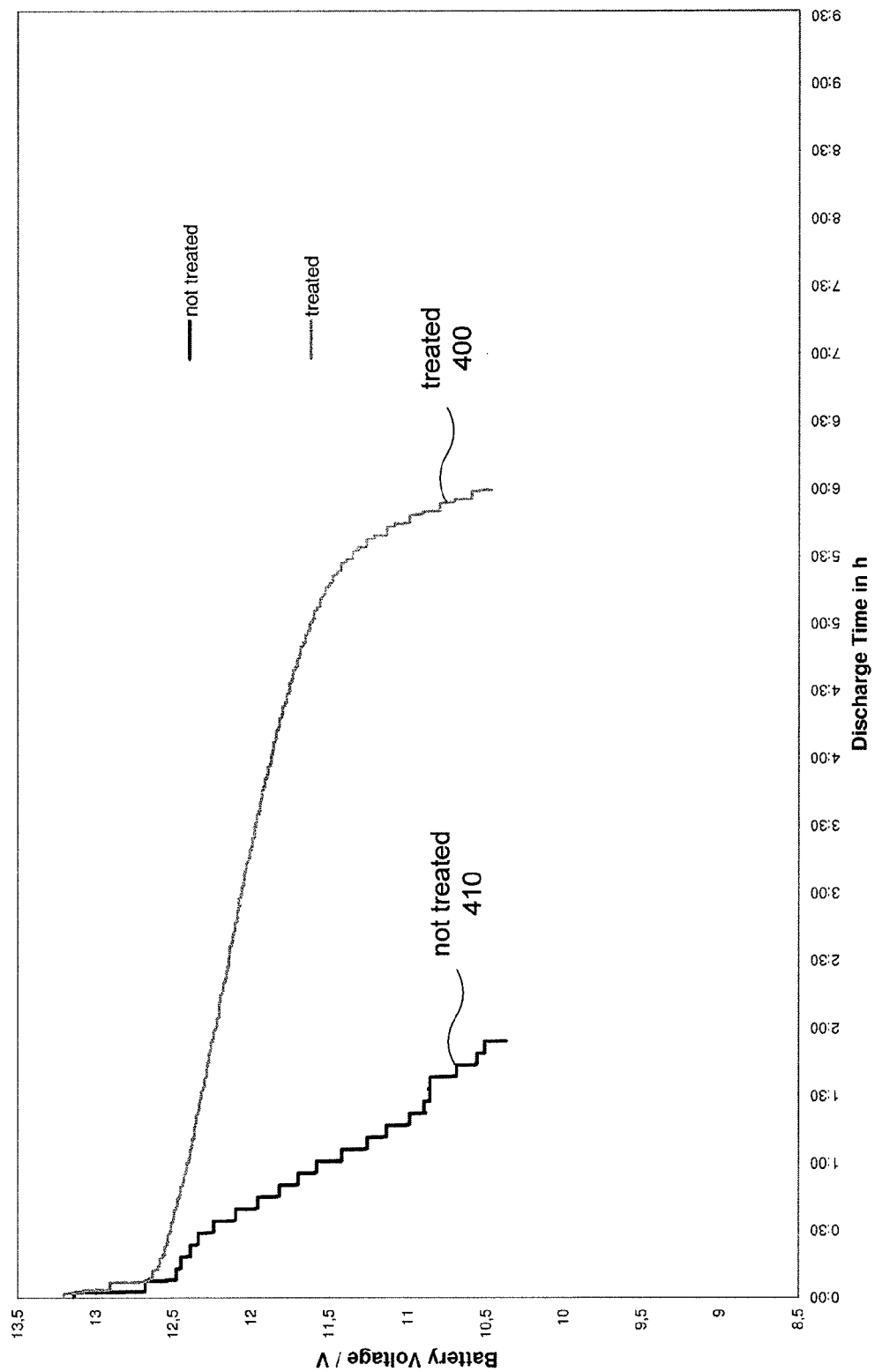
Figure 7:
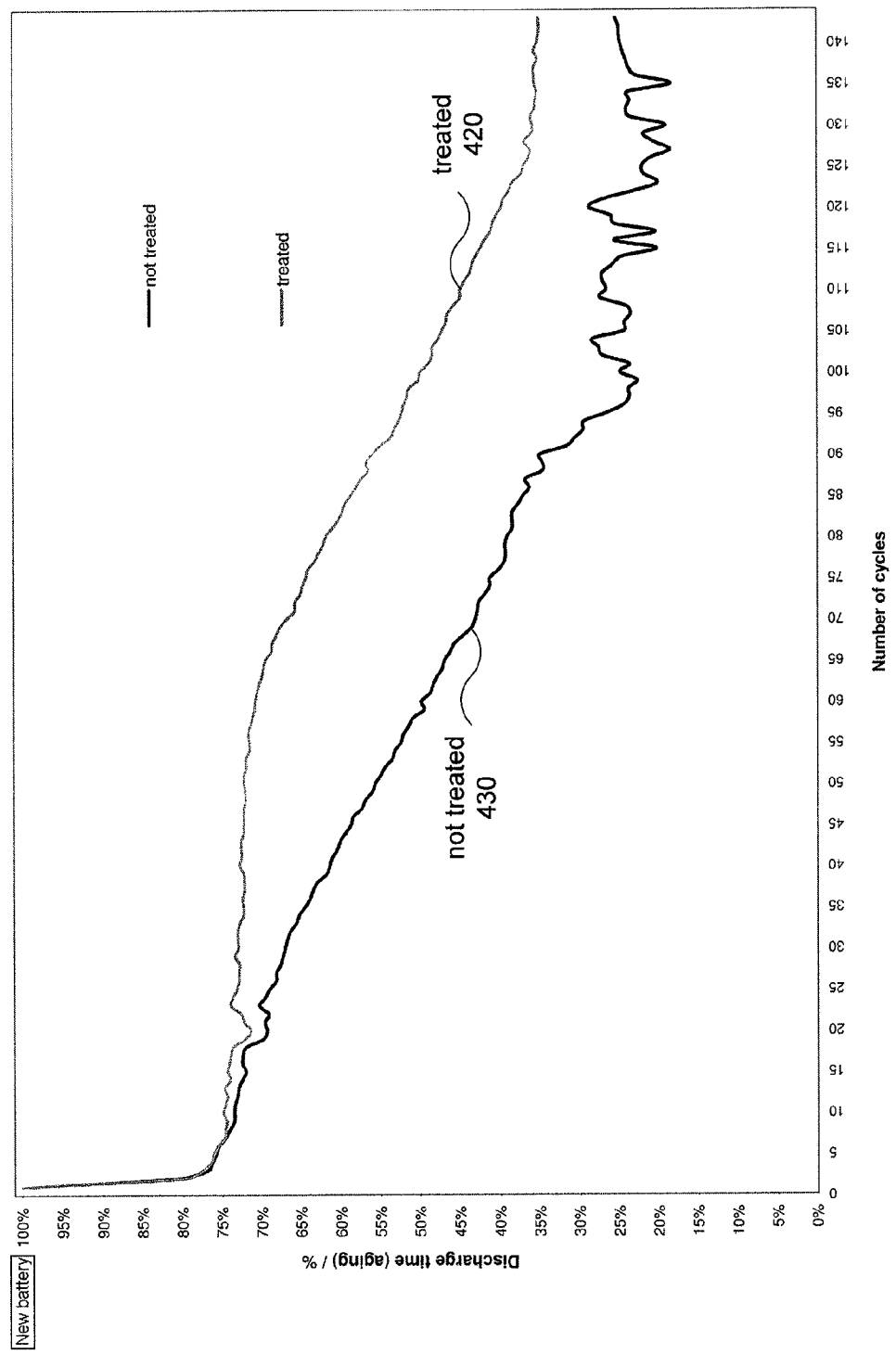

Having thus described the invention in general terms, reference will now be made to the accompanying drawings, which are not necessarily drawn to scale, and wherein:

FIG. 1 is a graphical representation comparing an exemplary overvoltage pulsing cycle imposed across the terminals of a battery in accordance with the present invention to the ratio of ionic densities in an electrochemical cell;

FIG. 2 is a block diagram illustrating an embodiment of the bipolar overvoltage battery pulser of the present invention;

FIG. 3A illustrates an electrical circuit diagram representing an embodiment of a microcontroller of a bipolar overvoltage battery pulser of the present invention;

FIG. 3B illustrates an electrical circuit diagram representing an embodiment of a voltage driver of a bipolar overvoltage battery pulser of the present invention;

FIG. 3C illustrates an electrical circuit diagram representing an embodiment of a voltage amplifier and a pulsed voltage distributor of a bipolar overvoltage battery pulser of the present invention;

FIG. 3D illustrates an electrical circuit diagram representing an embodiment of a bipolar overvoltage battery pulser of the present invention comprising a microcontroller, a voltage driver, and a voltage amplifier;

FIG. 4 is a perspective view of an embodiment showing a bipolar overvoltage battery pulser of the present invention integrated with a battery;

FIG. 5 is a block diagram illustrating an embodiment of the invention having a plurality of bipolar overvoltage battery pulsers integrated with a corresponding number of batteries;

FIG. 6 is a graphical representation showing the time to discharge for a battery that has been processed according to an embodiment of the invention versus the time to discharge for a battery that has not been so processed; and FIG. 7 is a graphical representation of the discharge times versus the number of charge/discharge cycles for a battery that has been processed according to an embodiment of the invention compared to the discharge times versus the number of charge/discharge cycles for a battery that has not been so processed.

DETAILED DESCRIPTION OF THE INVENTION

The present invention now will be described more fully hereinafter with reference to the accompanying drawings, in which some, but not all embodiments of the inventions are shown. Preferred embodiments of the invention may be described, but this invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments of the invention are not to be interpreted in any way as limiting the invention. Like numbers refer to like elements throughout.

As used in the specification and in the appended claims, the singular forms "a", "an", and "the" include plural referents unless the context clearly indicates otherwise. For example, reference to "a battery" includes a plurality of such batteries.

It will be understood that relative terms, such as "preceding" or "followed by" or the like, may be used herein to describe one element's relationship to another element as illustrated in the Figures. It will be understood that relative terms are intended to encompass different orientations of the elements in addition to the orientation of elements as illustrated in the Figures. It will be understood that such terms can be used to describe the relative positions of the element or elements of the invention and are not intended, unless the context clearly indicates otherwise, to be limiting.

Embodiments of the present invention are described herein with reference to various perspectives, including perspective views that are schematic representations of idealized embodiments of the present invention. As a person having ordinary skill in the art to which this invention belongs would appreciate, variations from or modifications to the shapes as illustrated in the Figures are to be expected in practicing the invention. Such variations and/or modifications can be the result of manufacturing techniques, design considerations, and the like, and such variations are intended to be included herein within the scope of the present invention and as further set forth in the claims that follow. The articles of the present invention and their respective components illustrated in the Figures are not intended to illustrate the precise shape of the component of an article and are not intended to limit the scope of the present invention.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

The invention described herein relates to a bipolar overvoltage battery pulser. The bipolar overvoltage battery pulser is generally comprised of a pulse generator that produces a positive pulsed voltage and a negative pulsed voltage, a pulsed voltage driver that converts the positive pulsed voltage and negative pulsed voltage into a positive pulsed voltage waveform and a negative pulsed voltage waveform, a pulsed voltage distributor that merges the positive pulsed voltage waveform and the negative pulsed voltage waveform into a pulsed voltage waveform that is applied across the terminals of a battery, and, optionally, an amplifier, which may amplify the positive pulsed voltage waveform and the negative pulsed voltage waveform or the pulsed voltage waveform.

In an embodiment of the invention, the pulse generator may be configured in a microcontroller. In another embodiment of the invention, the pulse generator comprises a positive pulse generator and a negative pulse generator. In other embodiments of the invention, the pulse generator may comprise an alternating inverter switch that alternately processes a pulsed voltage into the positive pulsed voltage and the negative pulsed voltage. Without intending to be limiting, the inventive device is particularly useful for increasing a cycle lifetime of the battery and improving the ability of the battery to retain capacity.

If voltage pulses are imposed across the electrodes of a battery cell, a change in potential between the electrochemical solution and the electrodes will be experienced. In all chemical systems, for example, without intending to be limiting, a lead acid battery, there is a tendency to change to the equilibrium state.

If an existing equilibrium is disturbed, for example, by imposing a change in the potential at the electrode, then the ratio of the ionic density of the electrochemical solution to ionic density of the surface layer at the electrode will change until a new equilibrium condition is achieved. The relaxation time is defined as the amount of time needed for the system to arrive at a new equilibrium condition. The relaxation time constant, which characterizes the change in ratio of ionic densities versus time, is defined by the specific dielectric constant divided by the specific electrical conductivity, both of which are properties of the electrolytic solution.

A positive voltage pulse that is imposed across an electrochemical system, a pulsetype A, is defined by the rise time of the pulse, which refers to the amount of time needed for the starting edge of the voltage pulse to make a transition from about the time when the pulse begins to rise to about the time when the maximum peak of the pulse is reached.

If the rise time of pulsetype A is less than the relaxation time of the electrochemical system, then an overvoltage condition is imposed on the electrochemical system, then the ion density ratio will change to a new value over the course of the relaxation time based on the newly imposed potential difference according to the Boltzmann distribution law of equation (1). A positive voltage pulse causing an overvoltage in an electrochemical system will cause the ratio of the ionic density of the electrochemical solution to ionic density of the surface layer at the electrode to increase until such positive voltage pulse is removed, which will allow the electrochemical system to return or relax back to its original equilibrium state.

Conversely, an overvoltage condition may also be imposed by using a negative voltage pulse, or a pulsetype B, which has an inverse polarity of that of the positive voltage pulse pulsetype A. During the time while pulsetype B is applied, the ratio of ionic ionic densities will decrease, but after the pulsetype B is terminated, the ratio of ionic densities will relax back to the value fulfilling the Boltzmann distribution according to equation (1). The rise time for a negative voltage pulse refers to the amount of time needed for the trailing edge of the voltage pulse to make a transition from about the time when the trailing edge of the pulse begins to change to about the time when the pulse is no longer being applied. If the rise time of the trailing edge of the negative voltage pulse is less than the relaxation time of the system, then an overvoltage condition is imposed on the electrochemical system.

It has been discovered that if similar positive voltage pulses, or pulsetypes A, at a high frequency are imposed on an electrochemical system, one following the other, then less overvoltage is achieved from the second pulse as a result of the inability of the ratio of the ionic density of the electrochemical solution to the ionic density of the surface layer to return to its equilibrium state. It has been further discovered that this "memory effect" may be avoided by including a negative voltage pulse, pulsetype B, between the two positive voltage pulses, pulsetypes A, all of which are alternately applied across the electrodes of a battery.

Without intending to be bound by theory, application of the pulsetype B functions to "reset" the effect caused by the pulsetype A, and vice versa, preventing this "memory effect" from being realized. It has also been discovered that through the "waiting time" or relaxation time after a pulse is terminated, the frequency of pulsetype A and pulsetype B, except without overlap in the pulses, may be increased also having a favorable affect by lengthening the time the electrochemical system is in a non-equilibrium state.

Faster rise times of the leading edge of the positive voltage pulse and the trailing edge of the negative voltage pulse will increase the extent of overvoltage that may be applied to the battery. Overvoltage applied to the battery will also allow for higher frequency pulses resulting in even more time the electrochemical system experiences a non-equilibrium state.

Under equilibrium conditions nothing happens—i.e., there is no net effect of change to the electrochemical system. Changes can be invoked on the electrochemical system to interrupt equilibrium by imposing overvoltage pulses between an electrode and the "cloud" of ions surrounding the electrode. This results in an overvoltage period with an increased electrical field force acting upon the cloud of ions, which, at an increased number and energy, will be drawn to the electrodes. At the same time, the diffusions force, or the resulting drawing ions away from the electrode is weaker than the electrical force.

Through higher velocity and energy, ions with attached ions having opposite polarity will lose these attached ions resulting in an increase to their own velocity and energy. High energy ions, for example, a positive hydrogen ion $H_2^+$ from a divided water molecule may penetrate through any crystalline structures which may have developed at the negative electrode. In a non-limiting example, in a lead acid battery, the positive hydrogen ion may penetrate any lead sulfate $PbSO_4$ crystalline layer that may have formed at the negative electrode, and dissolute the crystalline layer by forming sulfuric acid $H_2SO_4$ thereby replenishing the electrochemical solution while leaving pure lead at the electrode.

In another non-limiting example, a negative oxide ion from a divided water molecule will contribute to rebuilding lead dioxide $PbO_2$ crystals on the positive electrode. Without intending to be limited by the theory, less energy is required to build large existing crystals even larger; therefore, a more homogenous, with a greater number of lead dioxide crystals, will be experienced at the positive electrode. Hence, under the circumstances imposed by the invention, the "birth rate" of new crystals proportionately increases more relative to the value of overvoltage imposed.

FIG. 1 is a graphical representation comparing an overvoltage pulsing cycle imposed across the terminals of a battery to the ratio of ionic densities in an electrochemical cell. The solid line 10 represents the voltage of the battery, the curve 12 represents the ratio of ionic densities, and the overvoltage states 14, 16, 18 imposed on the electrochemical cell. The rise times of the positive voltage pulse and negative voltage pulse are represented by $T_r$, while the relaxation time constant is represented by $T_c$.

In a lead acid battery, for example, the growth of lead sulfate crystals on the negative electrode and the reduced number of lead dioxide crystals on the positive electrode may result in a reduction in the overall life of the battery. Also, it has been further discovered, that a reduction in the memory effect increases the opportunity for overvoltage and the application of amplitude of an overvoltage pulse will also result in increasing the overall life of a battery. By repetitively applying a positive voltage pulse across the electrodes of a battery, which imposes an overvoltage condition on the battery, followed by applying a negative voltage pulse across the electrodes of a battery, which imposes a similar overvoltage condition to counteract the effects of the prior overvoltage condition, the memory effect experienced by the battery is reduced and an increase in cycle lifetime of the battery and an ability of the battery to retain capacity is realized. In certain embodiments of the invention, the lifetime of a battery may be increased by a factor between 1.7 and 2.2 as shown by the increase in cycle lifetimes in FIG. 7. For example, in an embodiment of the invention, the method of the present invention such as that implemented through a bipolar overvoltage battery pulser of the present invention increases the cycle lifetime of the battery by as much as about 10% in comparison to a similar battery where the present invention has not been applied. In a further embodiment, a bipolar overvoltage battery pulser of the present invention increases the life of a battery by as much as about 50%. In a further embodiment, a bipolar overvoltage battery pulser of the present invention increases the life of a battery by as much as about 70%. In a further embodiment, a bipolar overvoltage battery pulser of the present invention increases the life of a battery by as much as about 120%. In a further embodiment, a bipolar overvoltage battery pulser of the present invention increases the life of a battery by as much as about 200%. In a further embodiment, a bipolar overvoltage battery pulser of the present invention increases the life of a battery by as much as about 250%.

In other embodiments of the invention, the method of the present invention such as that implemented through a bipolar overvoltage battery pulser of the present invention retains capacity of a battery by at least about 10% greater than the retained capacity of a similar battery where the invention has not been applied. In a further embodiment, a bipolar overvoltage battery pulser of the present invention retains capacity of a battery by at least about 50% greater than the retained capacity of a similar battery where the invention has not been applied. In a further embodiment, a bipolar overvoltage battery pulser of the present invention retains capacity of a battery by at least about 100% greater than the retained capacity of a similar battery where the invention has not been applied. In a further embodiment, a bipolar overvoltage battery pulser of the present invention retains capacity of a battery by at least about 150% greater than the retained capacity of a similar battery where the invention has not been applied.

In certain embodiments of the invention, the pulsing cycle for increasing the cycle lifetime of the battery and/or allowing the battery to retain capacity may be invoked by a device or apparatus known herein as a bipolar overvoltage battery pulser. FIG. 2 is a block diagram illustrating an embodiment of a bipolar overvoltage battery pulser 1. In this illustrative embodiment of the invention, the bipolar overvoltage battery pulser 1 comprises a pulse generator 20 for producing a positive pulsed voltage and a negative pulsed voltage. In this exemplary embodiment represented by FIG. 2, the pulse generator 20 is configured in a microcontroller 22, the microcontroller additionally comprising an analog-to-digital (AD) converter 24, voltage monitoring 26, and on/off control logic 28. Optionally, a status LED 30 may indicate the status of the microcontroller 22 and/or the pulse generator 20.

FIG. 3A illustrates an electrical circuit diagram representing an embodiment of a bipolar overvoltage battery pulser 1 having a microcontroller 22 that implements the pulse generator 20. The microcontroller 22, in this exemplary embodiment, is an 8-bit microcontroller based on the RISC architecture. The microcontroller 22 may include any number of features needed to support the ability to configure and implement the pulse generator 20 including, without limitation, CPU; working registers; non-volatile memory segments that may include, but not necessarily be limited to, flash program memory, EEPROM, and input/output buffers; timer/counters; oscillator; ADC channels; serial interface; ADC conversion; and interrupts. The digital supply voltage VCC to the microcontroller 22 is provided by a 5-volt supply source 100 and supply inductor 102. The analog-to-digital converter 24 supply voltage to the analog converter ADCC is provided by a 5-volt supply source 104, which may be the same supply source as the 5-volt supply source 100 or a different 5-volt supply source, and secondary inductor 106. Reset input 108 is provided at Port C PC6. The positive pulsed voltage 110 is output at PB1 of the microcontroller 22 while the negative pulsed voltage 112 is output at PB2 of the microcontroller 22.

In another embodiment of the invention, the pulse generator 20 may produce a positive pulsed voltage and a negative pulsed voltage through an electrical circuit arrangement. Any electronic circuit arrangement known in the art for producing a pulsed voltage may be used to generate a positive pulsed voltage and a negative pulsed voltage.

In yet another embodiment of the invention, a pulse generator generates a pulsed voltage and an alternating inverter switch alternately processes the pulsed voltage into a pass-through pulsed voltage and an inverted pulsed voltage. The pass-through pulsed voltage is either one of the positive pulsed voltage and the negative pulsed voltage, while the inverted pulsed voltage is the other of the positive pulsed voltage and the negative pulsed voltage.

As also shown in FIG. 2, a positive pulsed voltage driver 32 converts the positive pulsed voltage to a positive pulsed voltage waveform 34. Similarly, a negative pulsed voltage driver 36 converts the negative pulsed voltage to a negative pulsed voltage waveform 38. The positive pulsed voltage waveform 34 and the negative pulsed voltage waveform 38 are generally defined by a pulse cycle frequency, a pulse width, a pulse amplitude, a rise time of the positive pulse starting edge, and a rise time of the negative pulse trailing edge, respectively.

In certain embodiments of the invention, the positive pulsed voltage driver 32 and the negative pulsed voltage driver 36 each shape and provide the necessary timing for the positive pulsed voltage waveform 34 and negative pulsed voltage waveform 38, respectively. In an embodiment of the invention, either or both of the positive pulsed voltage driver 32 and negative pulsed voltage driver 36 comprise a pulse shaper and a timing generator (not shown). The pulse shaper and timing generator are configured to convert a pulsed voltage to a pulsed voltage waveform.

FIG. 3B illustrates an electrical circuit diagram representing an embodiment of a pulsed voltage driver 120 of a bipolar overvoltage battery pulser 1, wherein the positive pulsed voltage driver 32 and the negative pulsed voltage driver 36 are embodied in an integrated circuit 122. The positive voltage pulse 110 and the negative voltage pulse 112 are respectively input to the High Driver Logic Input HIN and Lower Driver Logic Input LIN of the integrated circuit 122. The integrated circuit 122 is supplied by a 12-volt supply source 124 whose current is restricted by resistor 126. A bootstrap circuit comprising a diode 128 and bootstrap capacitor 130 is used to supply the high voltage section of the integrated circuit 122. A floating voltage reference 132 is provided by the integrated circuit 122 at output pin OUT. The positive pulsed voltage waveform 134 and negative pulsed voltage waveform 136 are output from the integrated circuit 22 at the high side driver output HVG and low side driver output LVG, respectively. The rise times of the high and low side driver outputs may be controlled by the load capacitance.

According to other embodiments of the invention, the positive pulsed voltage driver and the negative pulsed voltage driver may be embodied in separate configurations, such as, for example, through separate integrated circuits.

As further shown in FIG. 2, the positive pulsed voltage waveform and the negative pulsed voltage waveform may be amplified using a positive voltage amplifier 40 and a negative voltage amplifier 42, which are supplied by a power supply 44. For example, the voltage of the power supply must be sufficient to enable the amplitude voltages of the positive pulsed voltage waveform and the inverted negative pulsed voltage waveform to exceed the voltage of the battery.

The positive pulsed voltage waveform 46 and the negative pulsed voltage waveform 48, whose signals have been amplified, are merged into a pulsed voltage waveform 52 via a pulsed voltage distributor 50 or a pulsed voltage distributor circuit. The pulsed voltage distributor 50 applies the pulsed voltage waveform 52, representing a combination of the positive pulsed voltage waveform 46 and the negative pulsed voltage waveform 48, across the terminals of a battery 54.

FIG. 3C illustrates an electrical circuit diagram representing an embodiment of the positive voltage amplifier 40, negative voltage amplifier 42, and pulsed voltage distributor 50 of a bipolar overvoltage battery pulser representing an output stage 140 of an exemplary bipolar overvoltage battery pulser.

In another embodiment of the invention, instead of amplifying the positive pulsed voltage waveform and the negative pulsed voltage waveform, the pulsed voltage waveform 52 may itself be amplified (not shown). In yet another embodiment of the invention, the positive pulsed voltage driver 32 and the negative pulsed voltage driver 36 are configured to provide the necessary voltage amplification of the positive pulsed voltage waveform and the negative pulsed voltage waveform, and additional amplification is not necessary.

FIG. 3D illustrates an electrical circuit diagram representing an embodiment of a bipolar overvoltage battery pulser of the present invention comprising a microcontroller 22 than provides a positive pulsed voltage and a negative pulsed voltage to a pulsed voltage driver 120. The pulsed voltage driver 120 then provides a positive pulsed voltage waveform and negative pulsed voltage waveform to an output stage 140 of the bipolar overvoltage battery pulser. The amplified and combined pulsed voltage waveforms from the output stage 140 are applied across the terminals of a battery.

According to FIG. 1, the rise times of the positive voltage pulse and negative voltage pulse as applied across the terminals of a battery are represented by $T_r$. The relaxation time constant, which defines the time needed for the ratio of ionic densities to relax back to an equilibrium state, is represented by $T_c$. The pulse width of the pulses of the positive voltage pulse waveform and negative voltage pulse waveform is represented by T. The time between the starting edge of the positive pulse and the starting edge of the negative pulse is defined as $T_{a-b}$. The period, the reciprocal of pulse cycle frequency, is represented by $T_{a-a}$. The positive pulsed voltage driver 32 and the negative pulsed voltage driver 36 are configured to produce a positive pulsed voltage waveform 34 and a negative pulsed voltage waveform 38 wherein the rise time of the positive pulse starting edge and the rise time of the negative pulse trailing edge are shorter than the relaxation time constant of the electrochemical cell. In certain embodiments of the invention, the rise time of the starting edge of the positive voltage pulse and the trailing edge of the negative voltage pulse are configured to be at most ¾ of the relaxation time constant. In another embodiment of the invention, the rise time of the starting edge of the positive voltage pulse and the trailing edge of the negative voltage pulse are configured to be at most ½ of the relaxation time constant. In a further embodiment of the invention, the rise time of the starting edge of the positive voltage pulse and the trailing edge of the negative voltage pulse are configured to be at most ⅓ of the relaxation time constant. In certain embodiments of the invention, the rise time of the starting edge of the positive voltage pulse and the trailing edge of the negative voltage pulse are configured to be at most ¼ of the relaxation time constant. In certain embodiments of the invention, the rise time of the starting edge of the positive voltage pulse and the trailing edge of the negative voltage pulse are configured to be at most ⅛ of the relaxation time constant. In certain embodiments of the invention, the rise time of the starting edge of the positive voltage pulse and the trailing edge of the negative voltage pulse are configured to be at most $\frac{1}{10}$ of the relaxation time constant. In other embodiments of the invention, the rise time of the starting edge of the positive voltage pulse and the trailing edge of the negative voltage pulse are different but each are configured to be less than the relaxation time constant.

In other embodiments of the invention, the rise time of the positive pulse starting edge and the rise time of the negative pulse trailing edge are shorter than the relaxation time of the electrochemical cell. In certain embodiments of the invention, the rise time of the starting edge of the positive voltage pulse and the trailing edge of the negative voltage pulse are configured to be at most $\frac{1}{2}$ of the relaxation time. In another embodiment of the invention, the rise time of the starting edge of the positive voltage pulse and the trailing edge of the negative voltage pulse are configured to be at most $\frac{1}{3}$ of the relaxation time. In further embodiments of the invention, the rise time of the starting edge of the positive voltage pulse and the trailing edge of the negative voltage pulse are configured to be at most $\frac{1}{4}$ of the relaxation time. In certain other embodiments of the invention, the rise time of the starting edge of the positive voltage pulse and the trailing edge of the negative voltage pulse are configured to be at most $\frac{1}{8}$ of the relaxation time. In still other embodiments of the invention, the rise time of the starting edge of the positive voltage pulse and the trailing edge of the negative voltage pulse are configured to be at most $\frac{1}{10}$ of the relaxation time. In other embodiments of the invention, the rise time of the starting edge of the positive voltage pulse and the trailing edge of the negative voltage pulse are different but each are configured to be less than the relaxation time.

In an embodiment of the invention, the pulse cycle frequency is maximized and yet should not be so high as to allow overlapping of the pulses of the positive pulsed voltage waveform and the negative pulsed voltage waveform. In certain embodiments of the invention, the pulse cycle frequency ranges from about 30 kHz to about 100 kHz, giving a period from about 10 microseconds to about 35 microseconds.

In an embodiment of the invention, the pulse duration exceeds the relaxation time. According to an embodiment of the invention, the pulse duration is at least 5 times the relaxation time. In another embodiment of the invention, the pulse duration is at least 10 times the relaxation time. In yet another embodiment of the invention, the pulse duration is at least 20 times the relaxation time. In still yet another embodiment of the invention, the pulse duration is at least 30 times the relaxation time. In a further embodiment of the invention, the pulse duration is at least 40 times the relaxation time. In a further embodiment of the invention, the pulse duration is at least 50 times the relaxation time. In a further embodiment of the invention, the pulse duration is at least about 100 times the relaxation time.

The time between the starting edge of the positive pulse and the starting edge of the negative pulse is some fraction of the period. In an embodiment of the invention, the amount of time between the starting edge of the positive pulse and the starting edge of the negative pulse is selected such that there is no overlap between the pulses of the positive pulsed voltage waveform and the negative pulsed voltage waveform. According to an embodiment of the invention, the time between the starting edge of the positive pulse and the starting edge of the negative pulse is at least $\frac{1}{4}$ of the period. In another embodiment of the invention, the time between the starting edge of the positive pulse and the starting edge of the negative pulse is at least $\frac{1}{3}$ of the period. In yet another embodiment of the invention, the time between the starting edge of the positive pulse and the starting edge of the negative pulse is at least $\frac{1}{2}$ of the period. In still yet another embodiment of the invention, the time between the starting edge of the positive pulse and the starting edge of the negative pulse is at least $\frac{3}{4}$ of the period.

In order to achieve an overvoltage, the pulse amplitudes of the pulses of the positive voltage pulse waveform and the negative voltage pulse waveform should exceed the voltage of the battery. In an embodiment of the invention, the pulse amplitude of the pulses of the positive voltage pulse waveform and the negative voltage pulse waveform is at least about 10% greater than the voltage of the battery. In another embodiment of the invention, the pulse amplitude of the pulses of the positive voltage pulse waveform and the negative voltage pulse waveform is at least about 20% greater. In another embodiment of the invention, the pulse amplitude of the pulses of the positive voltage pulse waveform and the negative voltage pulse waveform is at least about 50% greater. In another embodiment of the invention, the pulse amplitude of the pulses of the positive voltage pulse waveform and the negative voltage pulse waveform is at least about 100% greater. In another embodiment of the invention, the pulse amplitude of the pulses of the positive voltage pulse waveform and the negative voltage pulse waveform is at least about 150% greater. In another embodiment of the invention, the pulse amplitude of the pulses of the positive voltage pulse waveform and the negative voltage pulse waveform is at least about 200% greater.

In certain embodiments of the invention, the pulse amplitude of the pulses of the positive voltage pulse waveform and the negative voltage pulse waveform is in a range from about 75% to about 125% greater than the voltage of the battery. In another embodiment of the invention, the pulse amplitude of the pulses of the positive voltage pulse waveform and the negative voltage pulse waveform is in a range from about 80% to about 120% greater than the voltage of the battery. In another embodiment of the invention, the pulse amplitude of the pulses of the positive voltage pulse waveform and the negative voltage pulse waveform is in a range from about 90% to about 110% greater than the voltage of the battery. In yet other embodiments of the invention, the pulse amplitude of the pulses of the positive voltage pulse waveform and the negative voltage pulse waveform is about twice that of the voltage of the battery.

In certain embodiments of the invention, the pulse amplitudes of the pulses of the positive voltage pulse waveform and the negative voltage pulse waveform are not the same. In yet other embodiments of the invention, the pulse durations and pulse amplitudes of the positive voltage pulse waveform and the negative voltage pulse waveform are each adjusted allowing for the greatest possible extent of overvoltage to be applied to the battery and/or the greatest increase in the cycle lifetime of the battery.

In an embodiment of the invention, a measurement device provides the voltage of the battery and provides the measurement feedback to a controller that is configured to reset the pulse amplitudes of the pulses of the positive voltage pulse waveform and the negative voltage pulse waveform provided by the bipolar overvoltage battery pulser to achieve a desired amount of overvoltage or a desired range of overvoltage.

In certain embodiments of the invention, the bipolar overvoltage battery pulser may also include a controller and a measurement device, which provides a measurement of the battery's voltage. The measurement of the battery's voltage may be used by the controller to identify and determine a state of the battery. For example, when the voltage of the battery is below a certain value, the controller may be logically configured to identify the battery is in a charging state. If the voltage of the battery exceeds a certain value, the controller may be logically configured to identify the battery is in a full state. Other state identifications may be configured based not only on the voltage of the battery but also the direction and/or rate of change of the voltage of the battery. Other measurements may also be incorporated in the state determination, such as, for example, a temperature of the battery. The controller may be configured to activate or deactivate the bipolar overvoltage battery pulser based on the state of the battery, as identified by the controller based upon the voltage of the battery and/or other measurements.

The bipolar overvoltage battery pulser may be a standalone device that is not directly integrated with a specific battery. In other embodiments of the invention, the bipolar overvoltage battery pulser may be integrated into a battery. FIG. 4 illustrates a perspective view of an embodiment of the invention showing the bipolar overvoltage battery pulser integrated with a battery. This exemplary embodiment of the invention illustrates a bipolar battery overvoltage pulser 1 that is designed to fit within the structure of a lead acid battery 200. The bipolar overvoltage battery pulser 1 is isolated from the electrolyte of the lead acid battery 200, for example, with the use of a barrier such as a plastic alloy. In this exemplary embodiment, the bipolar overvoltage battery pulser connects, internally, with the positive battery terminal 202 and the negative battery terminal 204.

While this exemplary embodiment demonstrates a bipolar overvoltage battery pulser 1 that is integrated with a lead acid battery 200, the use of the bipolar overvoltage battery pulser is not limited to only this type of battery. Rather the bipolar overvoltage battery pulser may be used with and/or may be integrated with other types of rechargeable batteries as well. In an embodiment of the invention the method and device of the invention may treat a lead acid battery.

The phenomena upon which the device and method of the invention are based would be useful in treating other types of batteries, other than lead acid batteries, where these batteries are characterized such that they would realize an improvement in the extent of battery capacity they were capable of retaining and an improvement in the overall life of the battery by the application of the device and method of the invention. Of course, the pulse specifications as well as other parameters associated with the device and method of the invention for these other types of batteries could be adapted to the properties of the materials that are specific to these other types of batteries. Therefore, in another embodiment of the invention, the method and device of the invention may treat other types of batteries (i.e., a non-lead acid battery). Non-limiting examples of the types of non-lead acid batteries in which the method and device of the invention may be used include a lithium ion battery, a lithium polymer battery, a lithium sulfate battery, a lithium titanate battery, a lithium iron phosphate battery, a thin film rechargeable lithium battery, a nickel metal hydride battery, a nickel cadmium battery, a nickel zinc battery, a nickel iron battery, a nickel hydrogen battery, a rechargeable alkaline battery, a silver oxide battery, a sodium sulfur battery, a vanadium redox battery, and any other type of rechargeable battery that is now know or later invented for which the invention applies.

FIG. 5 is an embodiment of the invention, as illustrated through a block diagram, showing how a plurality of bipolar overvoltage battery pulsers may be integrated with a corresponding number of batteries in a single power supply or battery pack. Each of the batteries 320, 322, 324, 326 in the battery pack 310 has a corresponding bipolar overvoltage battery pulser 310, 312, 314, 316. The batteries 320, 322, 324, 326 in the battery pack 310 are recharged by a charger 330. The bipolar overvoltage battery pulsers 310, 312, 314, 316 are equipped with a controller 340. The controller 340 cycles through activating and then deactivating each of the bipolar overvoltage battery pulsers 310, 312, 314, 316 over their operating period of the batteries 320, 322, 324, 326 to ensure that a high terminal voltage is not experienced by having more than one bipolar overvoltage battery pulser 310, 312, 314, 316 in operation at any one time.

Another aspect of the invention includes a method for increasing a cycle lifetime of a battery and/or allowing the battery to retain capacity. An embodiment of the invention includes a method of treating a battery with the use of the bipolar overvoltage battery pulser of the invention.

Another embodiment of the invention provides a method for treating a plurality of batteries in a battery pack, each battery having a bipolar overvoltage battery pulser of the invention, comprising controlling the bipolar overvoltage battery pulsers such that not more than one of the bipolar overvoltage battery pulsers is applying an overvoltage at any one time.

An embodiment of the invention involves a method that includes providing a positive pulsed voltage waveform and negative pulsed voltage waveform, and applying the positive pulsed voltage waveform and the negative pulsed voltage waveform alternately across terminals of a battery. Pursuant to this embodiment, the method additionally includes merging the positive pulsed voltage waveform and the negative pulsed voltage waveform into a pulsed voltage waveform prior to applying the merged waveforms across the terminals of a battery. In certain embodiments of the invention, the positive pulsed voltage waveform has a single positive pulsed voltage and the negative pulsed voltage waveform has a single negative pulsed voltage.

In another embodiment of the invention, the method additionally comprises amplifying the positive pulsed voltage waveform and the negative pulsed voltage waveform. In still another embodiment of the invention, the method comprises amplifying the pulsed voltage waveform in addition or as an alternative to amplifying the positive pulsed voltage waveform and the negative pulsed voltage waveform.

In another embodiment of the invention, the method additionally comprises producing a pulsed voltage. Further pursuant to this embodiment of the invention, a pulsed voltage may comprise any one or a combination of a positive pulsed voltage and a negative pulsed voltage.

In another embodiment of the invention, producing a pulsed voltage comprises generating a pulsed voltage and processing the pulsed voltage, alternately, into a pass-through pulsed voltage and an inverted pulsed voltage, wherein the pass-through pulsed voltage is any one of the positive pulsed voltage and the negative pulsed voltage, and the inverted pulsed voltage is the other of the positive pulsed voltage and the negative pulsed voltage.

In another embodiment of the invention, producing a pulsed voltage comprises shaping the positive pulsed voltage and the negative pulsed voltage, respectively, into a positive pulsed voltage shape and a negative pulsed voltage shape and timing a distribution of the positive pulsed voltage shape and a distribution of the negative pulsed voltage shape respectively into the positive pulsed voltage waveform and the negative pulsed voltage waveform.

FIG. 6 provides a graphical representation showing the time to discharge for a lead acid battery that has been processed according to the methods and/or device of the invention 400 versus the time to discharge for a lead acid battery that has not been so processed 410. As the graph illustrates, the amount of time for discharging a lead acid battery has been extended by more than about 150% by using the method and/or device of the invention, effectively resulting in increased battery capacity.

FIG. 7 provides a graphical representation of the discharge times versus the number of charge/discharge cycles for a lead acid battery that has been processed according to the method and/or device of the invention 420 compared to the discharge times versus the number of charge/discharge cycles for a lead acid battery that has not been so processed 430. The graph shows that the overall life of the lead acid battery treated according to the method and/or device of the invention has been extended by a factor between about 1.7 and about 2.2 in comparison to the lead acid battery that has not been so treated.

While these tests show that a device and method of the invention are effective at increasing the cycle lifetime and improving the retention of capacity of a lead acid battery, the theory surrounding the fundamentals of the invention is also applicable to other non-lead acid batteries, non-limiting examples of which have been provided herein.

Many modifications and other embodiments of the invention set forth herein will come to mind to one skilled in the art to which this invention pertains having the benefit of the teachings presented in the descriptions herein and the associated drawings. It will be appreciated by those skilled in the art that changes could be made to the embodiments described herein without departing from the broad inventive concept thereof. Therefore, it is understood that this invention is not limited to the particular embodiments disclosed, but it is intended to cover modifications within the spirit and scope of the present invention as defined by the appended claims.

That which is claimed:

1. A bipolar overvoltage battery pulser comprising:
a pulse generator configured to produce a positive pulsed voltage and a negative pulsed voltage;
a positive pulsed voltage driver configured to convert the positive pulsed voltage to a positive pulsed voltage waveform;
a negative pulsed voltage driver configured to convert the negative pulsed voltage to a negative pulsed voltage waveform; and
a pulsed voltage distributor configured to merge the positive pulsed voltage waveform and the negative pulsed voltage waveform into a pulsed voltage waveform and to apply the pulsed voltage waveform across terminals of a battery,
wherein the pulsed voltage waveform comprises at least one positive voltage pulse having a leading edge and a positive pulse amplitude followed by at least one negative voltage pulse having a trailing edge and a negative pulse amplitude, and a rise time of the leading edge and a rise time of the trailing edge are each less than a relaxation time of an electrolytic solution of the battery.

2. The bipolar overvoltage battery pulser according to claim 1, additionally comprising a microcontroller, wherein the pulse generator is configured in the microcontroller.

3. The bipolar overvoltage battery pulser according to claim 1, wherein the pulse generator comprises a positive pulse generator configured to generate the positive pulsed voltage and a negative pulse generator configured to generate the negative pulsed voltage.

4. The bipolar overvoltage battery pulser according to claim 1, wherein the pulse generator comprises an alternating inverter switch, wherein the alternating inverter switch alternately processes the pulsed voltage into a pass-through pulsed voltage and an inverted pulsed voltage, wherein the pass-through pulsed voltage is any one of the positive pulsed voltage and the negative pulsed voltage and the inverted pulsed voltage is the other one of the positive pulsed voltage and the negative pulsed voltage.

5. The bipolar overvoltage battery pulser according to claim 1, wherein the positive pulsed voltage driver and the negative pulsed voltage driver each comprises:
a pulse shaper; and
a timing generator,
wherein the pulse shaper and the timing generator are configured to convert a pulsed voltage to a pulsed voltage waveform.

6. The bipolar overvoltage battery pulser according to claim 1, further comprising:
a positive voltage amplifier configured to amplify the positive pulsed voltage waveform; and
a negative voltage amplifier configured to amplify the negative pulsed voltage waveform.

7. The bipolar overvoltage battery pulser according to claim 1, wherein the rise time of the leading edge and the rise time of the settling edge are about one-third of the relaxation time.

8. The bipolar overvoltage battery pulser according to claim 1, wherein the positive pulse amplitude and the negative pulse amplitude are each greater than a voltage of the battery.

9. The bipolar overvoltage battery pulser according to claim 8, wherein the positive pulse amplitude and the negative pulse amplitude are each at least twice the voltage of the battery.

10. The bipolar overvoltage battery pulser according to claim 9, the pulsed voltage waveform having a pulse cycle frequency such that a pulse width of the at least one positive voltage pulse and a pulse width of the at least one negative voltage pulse do not overlap.

11. The bipolar overvoltage battery pulser according to claim 1, wherein a pulse width of the at least one positive voltage pulse and a pulse width of the at least one negative voltage pulse each exceed the relaxation time.

12. The bipolar overvoltage battery pulser according to claim 1, additionally comprising:
a controller; and
a measurement device configured to measure a voltage of the battery,
wherein:
the controller is configured to identify a state of the battery using the voltage of the battery; and
the controller is configured to activate the bipolar overvoltage battery pulser based upon the state of the battery.

13. The bipolar overvoltage battery pulser according to claim 1, wherein the battery is any one of a lead acid battery and a non-lead acid battery.

14. The bipolar overvoltage battery pulser according to claim 1, further comprising a voltage amplifier configured to amplify the pulsed voltage waveform.

15. The bipolar overvoltage battery pulser according to claim 14, where the bipolar overvoltage battery pulser is integrated with the battery.

16. A method for treating a plurality of batteries of a battery pack, each battery having a bipolar overvoltage battery pulser, comprising controlling the bipolar overvoltage battery pulsers such that not more than one of the bipolar overvoltage battery pulsers is applying an overvoltage at any one time, wherein the bipolar overvoltage battery pulser comprises:
a pulse generator configured to produce a positive pulsed voltage and a negative pulsed voltage;

a positive pulsed voltage driver configured to convert the positive pulsed voltage to a positive pulsed voltage waveform;

a negative pulsed voltage driver configured to convert the negative pulsed voltage to a negative pulsed voltage waveform;

a pulsed voltage distributor configured to merge the positive pulsed voltage waveform and the negative pulsed voltage waveform into a pulsed voltage waveform and to apply the pulsed voltage waveform across terminals of a battery;

a positive voltage amplifier configured to amplify the positive pulsed voltage waveform; and a negative voltage amplifier configured to amplify the negative pulsed voltage waveform, wherein the positive pulsed voltage waveform comprises a leading edge and a positive pulse amplitude and the negative pulsed voltage waveform having a trailing edge and a negative pulse amplitude, and a rise time of the leading edge and a rise time of the trailing edge are each less than a relaxation time of an electrolytic solution of the plurality of batteries.

17. A method comprising:

providing a positive pulsed voltage waveform having a single positive pulse and negative pulsed voltage waveform having a single negative pulse; and applying the positive pulsed voltage waveform and the negative pulsed voltage waveform alternately across terminals of a battery, wherein the positive pulsed voltage waveform comprises a leading edge and the negative pulsed voltage waveform having a trailing edge and a negative pulse amplitude, and a rise time of the leading edge and a rise time of the trailing edge are each less than a relaxation time of an electrolytic solution of the battery.

18. The method according to claim 17, additionally comprising merging the positive pulsed voltage waveform and the negative pulsed voltage waveform into a pulsed voltage waveform prior to applying across the terminals of the battery.

19. The method according to claim 17, wherein applying the positive pulsed voltage waveform and the negative pulsed voltage waveform alternately across terminals of any one of a lead acid battery and a non-lead acid battery.

20. A method comprising:

producing a positive pulsed voltage and a negative pulsed voltage;

converting the positive pulsed voltage to a positive pulsed voltage waveform and the negative pulsed voltage to a negative pulsed voltage waveform;

merging the positive pulsed voltage waveform and the negative pulsed voltage waveform into a pulsed voltage waveform; and applying the pulsed voltage waveform across terminals of a battery, wherein the pulsed voltage waveform comprises at least one positive voltage pulse having a leading edge and a positive pulse amplitude followed by at least one negative voltage pulse having a trailing edge and a negative pulse amplitude, and a rise time of the leading edge and a rise time of the trailing edge are each less than a relaxation time of an electrolytic solution of the battery.

21. The method according to claim 20, additionally comprising amplifying at least one of the positive pulsed voltage waveform, the negative pulsed voltage waveform, and the pulsed voltage waveform.

22. The method according to claim 20, wherein producing a positive pulsed voltage and a negative pulsed voltage comprises:

generating a pulsed voltage; and processing the pulsed voltage, alternately, into a pass-through pulsed voltage and an inverted pulsed voltage, wherein the pass-through pulsed voltage is any one of the positive pulsed voltage and the negative pulsed voltage, and the inverted pulsed voltage is the other one of the positive pulsed voltage and the negative pulsed voltage.

23. The method according to claim 20, wherein converting the positive pulsed voltage to a positive pulsed voltage waveform and the negative pulsed voltage to a negative pulsed voltage waveform comprises:

shaping the positive pulsed voltage and the negative pulsed voltage respectively into a positive pulsed voltage shape and a negative pulsed voltage shape; and timing a distribution of the positive pulsed voltage shape and a distribution of the negative pulsed voltage shape respectively into the positive pulsed voltage waveform and the negative pulsed voltage waveform.

24. The method according to claim 20, wherein applying the pulsed voltage waveform across terminals of any one of a lead acid battery and a non-lead acid battery.

* * * * *